United States Patent
Adachi

(10) Patent No.: US 9,554,017 B2
(45) Date of Patent: Jan. 24, 2017

(54) GENERATING A USERNAME BASED ON USER NAME AND DOMAIN NAME OBTAINED FROM PRINT DATA ATTRIBUTE INFORMATION

(71) Applicant: CANON KABUSHIKI KAISHA, Tokyo (JP)

(72) Inventor: Tomoko Adachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/796,738

(22) Filed: Jul. 10, 2015

(65) Prior Publication Data
US 2016/0021262 A1 Jan. 21, 2016

(30) Foreign Application Priority Data
Jul. 17, 2014 (JP) ................. 2014-146767

(51) Int. Cl.
*G06F 3/12* (2006.01)
*H04N 1/44* (2006.01)
*H04N 1/40* (2006.01)

(52) U.S. Cl.
CPC ................. *H04N 1/4433* (2013.01)

(58) Field of Classification Search
None
See application file for complete search history.

(56) References Cited

U.S. PATENT DOCUMENTS

| 7,571,481 B2* | 8/2009 | Shimizu ........... G06F 21/56 358/1.13 |
| 2002/0097431 A1* | 7/2002 | Ikegami ........... G06F 21/608 358/1.15 |
| 2008/0030769 A1* | 2/2008 | Hanaoka ........... G03G 15/5075 358/1.15 |

(Continued)

FOREIGN PATENT DOCUMENTS

| JP | 9-293036 | 11/1997 |
| JP | 2010-198444 | 9/2010 |

(Continued)

OTHER PUBLICATIONS

Japanese Office Actions issued Apr. 19, 2016 during prosecution of related Japanese application No. 2014-146767.

(Continued)

*Primary Examiner* — Gabriel Garcia
(74) *Attorney, Agent, or Firm* — Fitzpatrick, Cella, Harper & Scinto

(57) ABSTRACT

There is provided an image processing apparatus which comprises: a receiving unit configured to receive a print job from an information processing apparatus; an obtaining unit configured to obtain at least owner information and domain information from a header of the print job; a generating unit configured to generate user identification information including the owner information and the domain information; a registering unit configured to register the user identification information; and a storage unit configured to store the print job in association with the user identification information. Thus, it is possible to register the appropriate user identification information according to environments of a network system.

17 Claims, 10 Drawing Sheets

(56) References Cited

U.S. PATENT DOCUMENTS

| | | | | |
|---|---|---|---|---|
| 2009/0235341 A1* | 9/2009 | Hashimoto | ........... | G06F 21/608 726/5 |
| 2012/0154847 A1* | 6/2012 | Ono | ...................... | G06F 3/1222 358/1.14 |
| 2012/0206763 A1* | 8/2012 | Yoshida | ................ | G06F 3/1204 358/1.15 |
| 2014/0215576 A1* | 7/2014 | Sugiyama | ................ | H04N 1/44 726/4 |

FOREIGN PATENT DOCUMENTS

| | | |
|---|---|---|
| JP | 2010-287107 | 12/2010 |
| JP | 2011-203997 | 10/2011 |
| JP | 2012-254618 | 12/2012 |

OTHER PUBLICATIONS

Japanese Office Action issued Jul. 19, 2016 during prosecution of related Japanese application No. 2014-146767.

* cited by examiner

| APPLICATION/FUNCTION | NECESSITY OF USER AUTHENTICATION/IDENTIFICATION |
|---|---|
| SET/REGISTER | ○ |
| COPY | × |
| PERSONAL PRINT | ○ |
| SCAN AND TRANSMIT | ○ |

| ATTRIBUTE NAME | VALUE |
|---|---|
| OWNER NAME | UserA |
| DOMAIN NAME | D |
| COMPUTER NAME | PCA |
| JOB NAME | test.txt |
| DATE | 20140530 |

| ATTRIBUTE NAME | VALUE |
|---|---|
| OWNER NAME | UserA |
| DOMAIN NAME | |
| COMPUTER NAME | PCA |
| JOB NAME | test.txt |
| DATE | 20140530 |

FIG. 10

| | IN CASE OF INCLUDING WHOLE INFORMATION | IN CASE OF NOT INCLUDING DOMAIN NAME | IN CASE OF INCLUDING ONLY OWNER NAME | IN CASE OF NOT INCLUDING COMPUTER NAME | IN CASE OF NOT INCLUDING OWNER NAME |
|---|---|---|---|---|---|
| OWNER NAME | UserA | UserA | UserA | UserA | — |
| DOMAIN NAME | D | — | — | D | — |
| COMPUTER NAME | PCA | PCA | — | — | PCA |
| USER IDENTIFICATION ID | UserA@D | UserA@PCA | UserA | UserA@D | Guest |

| USER IDENTIFICATION ID | USER NAME | CARD ID | MAIL ADDRESS | DEPARTMENT |
|---|---|---|---|---|
| Administrator | Administrator | | | |
| UserA@D | UserA D | | UserA@xxx.co.jp | DEVELOPMENT A |
| UserB@PcA | UserB PcA | Card1 | UserB@xxx.co.jp | CLERK C |
| ... | ... | ... | ... | ... |
| Guest | Guest | | | |
| OO Phone | OO Phone | | | |

800, 801, 802, 803, 804, 805, 806, 810

GENERATING A USERNAME BASED ON USER NAME AND DOMAIN NAME OBTAINED FROM PRINT DATA ATTRIBUTE INFORMATION

BACKGROUND OF THE INVENTION

Field of the Invention

The present invention relates to an image processing apparatus which saves a print job transmitted from an information processing apparatus for each user, and a controlling method for the image processing apparatus.

Description of the Related Art

An MFP (multi function peripheral) which is equipped with an image reading device, a printing device and a communicating device and has image processing applications of copying, printing, scanned-image transmitting and the like has been known. Moreover, since security consciousness has increased recently, a great number of MFPs have user authentication functions respectively. In the MFP like this, inputs of a user name and a password are accepted as authentication information via a touch panel, and/or authentication information is read and obtained from a card by using a card authentication function. However, to input the user name, the password and the like from the touch panel on the MFP or to install the card authentication function is troublesome for a user who wishes to use the MFP immediately and promptly in the aspects of costs and operability. Moreover, in the situation that the authentication function has not been installed because sever security is not so required, there are users who cannot use a personalization function of the MFP because there is no authentication function and thus cannot have usability.

Japanese Patent Application Laid-Open No. 2012-254618 discloses, as the means for saving user's trouble and enabling a user to easily use the personalization function, the MFP which displays the icon image associated with the user on the screen, and by which the user only has to select the displayed own icon image for using the personalization function.

In the MFP disclosed in Japanese Patent Application Laid-Open No. 2012-254618, the user is automatically registered by using, as the user ID for identifying the user, the job owner name and the computer name added in the print data for which the printing has been instructed from a PC (personal computer). However, since the users work in various office environments, there is a case where, in a small-scale office environment, the domain is not used in the user authentication for the PC but the local authentication is used. On the contrary, it is supposed that, in a large-scale office environment, the domain is used in the user authentication for the PC. Further, there is an environment that one user owns a plurality of PCs in the same office and logs in to each PC via the user authentication using the domain.

SUMMARY OF THE INVENTION

An image processing apparatus according to the present invention comprises: a receiving unit configured to receive a print job from an information processing apparatus; an obtaining unit configured to obtain at least owner information and domain information from a header of the print job; a generating unit configured to generate user identification information including the owner information and the domain information; a registering unit configured to register the user identification information; and a storage unit configured to store the print job in association with the user identification information.

According to the present invention, since the user identification information generated according to submitter information of print data is changed over and registered, it is possible to register the appropriate user identification information according to environments of a network system.

Further features of the present invention will become apparent from the following description of exemplary embodiments with reference to the attached drawings.

BRIEF DESCRIPTION OF THE DRAWINGS

FIG. 10 is a diagram illustrating an example of user identification ID generation patterns.

FIG. 11 is a diagram illustrating an example of user information stored by a user management section.

DESCRIPTION OF THE EMBODIMENTS

Hereinafter, preferred embodiments of the present invention will be described with reference to the attached drawings.

First Embodiment

<System Configuration>

Figure 1:
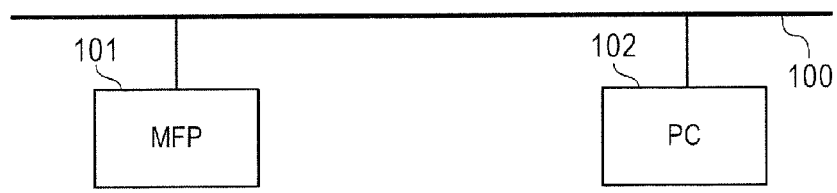
FIG. 1 is a diagram illustrating an example of the system configuration of a printing system.

FIG. 1 is a diagram illustrating an example of the system configuration of a printing system.

In the printing system, as illustrated in FIG. 1, an MFP 101 and a PC 102 are communicatively connected with each other through a LAN (local area network) 100. A print job is transmitted from the PC 102 to the MFP 101. The MFP 101 at least has the function of performing the printing after accumulating the print job which was received from the PC 102. The print job is an example of the printing job. The PC 102 is an example of an information processing apparatus.

<Hardware Constitution>

Figure 2:
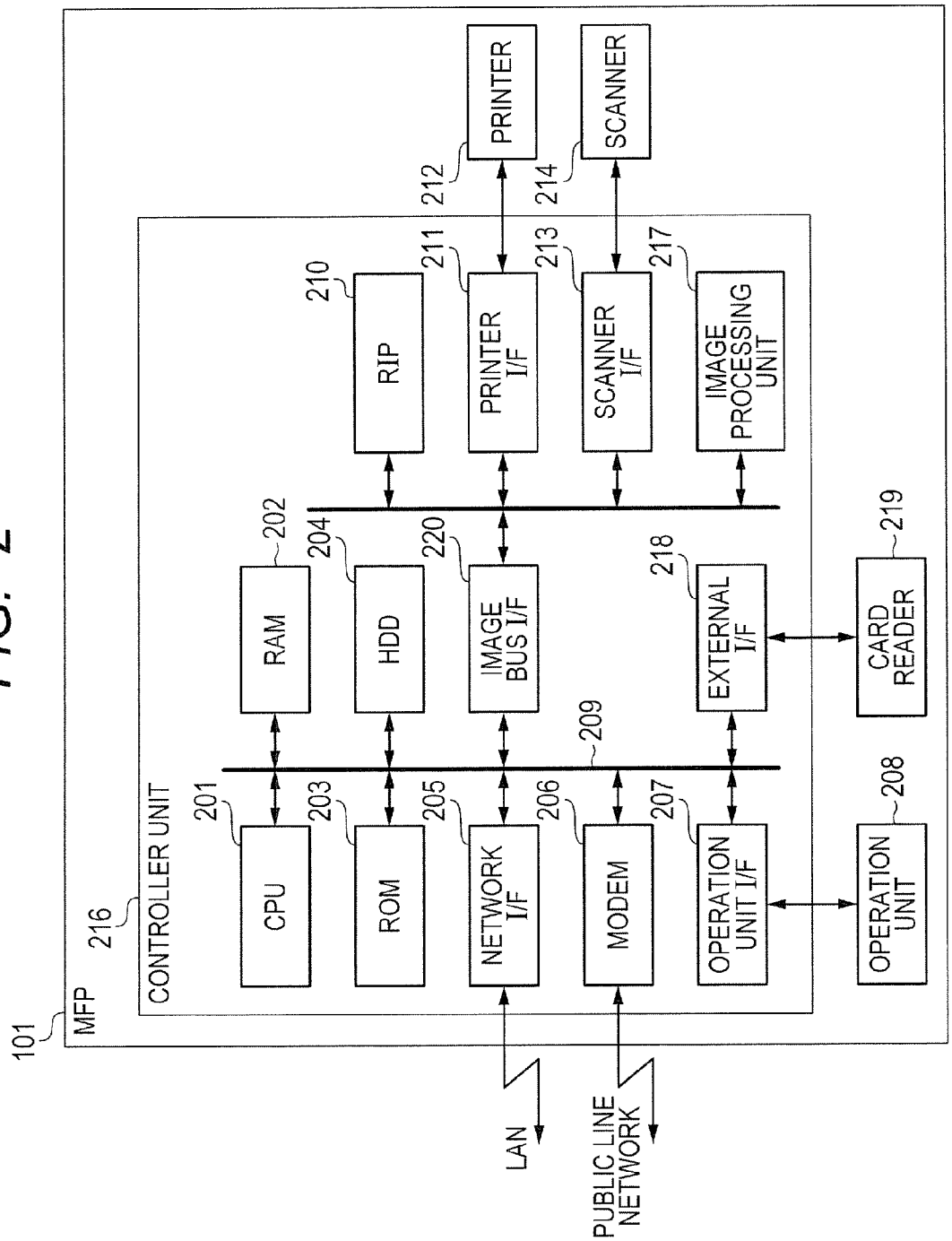
FIG. 2 is a block diagram illustrating an example of the hardware constitution of an MFP.

FIG. 2 is a block diagram illustrating an example of the hardware constitution of the MFP 101.

In FIG. 2, a controller unit 216 is connected with a scanner 214 which functions as an image input device and a printer 212 which functions as an image output device. On the other hand, the controller unit 216 also performs an input/output of image data or device information by connecting to a LAN or a public line network (WAN (wide area network)) (e.g., PSTN (public switched telephone network) or ISDN (Integrated Services Digital Network)).

In the controller unit 216, a CPU (central processing unit) 201 is a processor which controls the entire system. A RAM (random access memory) 202 is a system network memory used for operating the CPU 201, and also is a program memory used for recording programs or an image memory used for temporarily recording image data. The software configuration of the MFP 101 or processes in flow charts to be described later will be realized by the procedure that the CPU 201 performs processes on the basis of programs stored in a ROM (read only memory) 203 or an HDD (hard disk drive) 204.

A boot program of the system and various control programs are stored in the ROM 203. The HDD 204 stores various programs used for controlling the system, image data, user information, which is necessary for the user authentication/identification, and the like.

An operation unit I/F (interface) 207, which is an interface unit operating with an operation unit (UI (user interface)) 208, outputs image date to be displayed on the operation unit 208 to the operation unit 208.

In addition, the operation unit I/F 207 plays a role of transmitting information (e.g., user information or the like), which a user of the present system has input from the operation unit 208, to the CPU 201. Incidentally, the operation unit 208 has a display unit having a touch panel. The user can perform various instructions by depressing buttons (touching buttons with a finger or the like) displayed on the display unit.

A network I/F 205, which is connected to a network (LAN), performs input/output of data. A modem (modulator-demodulator) 206, which is connected to a public line network, performs input/output of data such as a transmission/reception of FAX or the like.

An external interface I/F 218 accepts an external input unit such as a USB (universal serial bus), an IEEE (Institute of Electrical and Electronics Engineers) 1394 unit, a printer port, an RS-232C (Recommended Standard 232 version C) unit or the like. For example, a card reader 219 used for reading an IC card necessary in authentication is connected. The CPU 201 controls the process of reading information from the IC card, which is performed by the card reader 219, through the external I/F 218 and can obtain the information which was read from the IC card. The above-described devices are arranged on a system bus 209.

An image bus I/F 220, which connects the system bus 209 to an image bus 215, which transfers image data at high speed, is a bus bridge which converts the data structure. The image bus 215 is constituted by a PCI (Peripheral Component Interconnect) bus or the IEEE 1394 unit. The following devices are arranged on the image bus 215.

An RIP (raster image processor) 210 develops vector data, for example, PDL (page description language) code or the like into a bitmap image. A printer I/F 211 connects the printer 212 with the controller unit 216 and performs synchronous/asynchronous conversion of image data. A scanner I/F 213 connects the scanner 214 with the controller unit 216 and performs the synchronous/asynchronous conversion of the image data.

An image processing unit 217 performs printer correction, resolution conversion or the like to the print output image data. More specifically, the image processing unit corrects, processes and edits the input image data. In addition, the image processing unit 217 performs image data rotation, and a compressing/decompressing process such as a JPEG (Joint Photographic Experts Group) method to multi-level image data, a JBIG (Joint Bi-level Image Experts Group) method, an MMR (Modified Modified Read) method, an MH (Modified Huffman) method or the like to binary image data.

The scanner 214 converts image data into electric signals as raster image data by illuminating an image on a paper, which is an original document, and scanning the image by a CCD (charge coupled device) line sensor. Original sheets are set in a tray of an original feeder, and the CPU 201 gives an instruction to the scanner 214 then the original feeder feeds the original sheets one by one and then an operation of reading an original image is performed by a procedure that a user instructs to start a reading process from the operation unit 208.

The printer 212 is such a part where the raster image data is converted into an image on a sheet, and as a method of the conversion, there is an electrophotographic method of using a photosensitive drum or a photosensitive belt, an inkjet method of directly printing an image on the sheet by discharging ink from a minute nozzle array, or the like. The activation of the printing operation is started by an instruction from the CPU 201. The printer 212 has plural paper feeding stages so that different paper size or different paper direction can be selected and has paper cassettes corresponding to those stages.

The operation unit 208 has an LCD (liquid crystal display) display unit, on which a touch panel sheet is attached, and displays an operation screen of the system, and when a key which is displayed is depressed, informs position information related to the depressed key to the CPU 201 through the operation unit I/F 207. In addition, the operation unit 208 has, for example, a start key, a stop key, an ID key, a reset key and the like as various operation keys. The card reader 219 reads information, which is stored in the IC card, by the control from the CPU 201 and notifies the information, which was read, to the CPU 201 through the external I/F 218.

By the above configuration, the MFP 101 can transmit image data, which was read from the scanner 214, onto the LAN 100, and can print out print data, which was received through the LAN 100, by using the printer 212.

In addition, the MFP 101 can fax-transmit the image data, which was read from the scanner 214, onto a public line by using the MODEM 206 and can output image data fax-received from the public line, by using the printer 212.

<Software Configuration>

Figure 3:
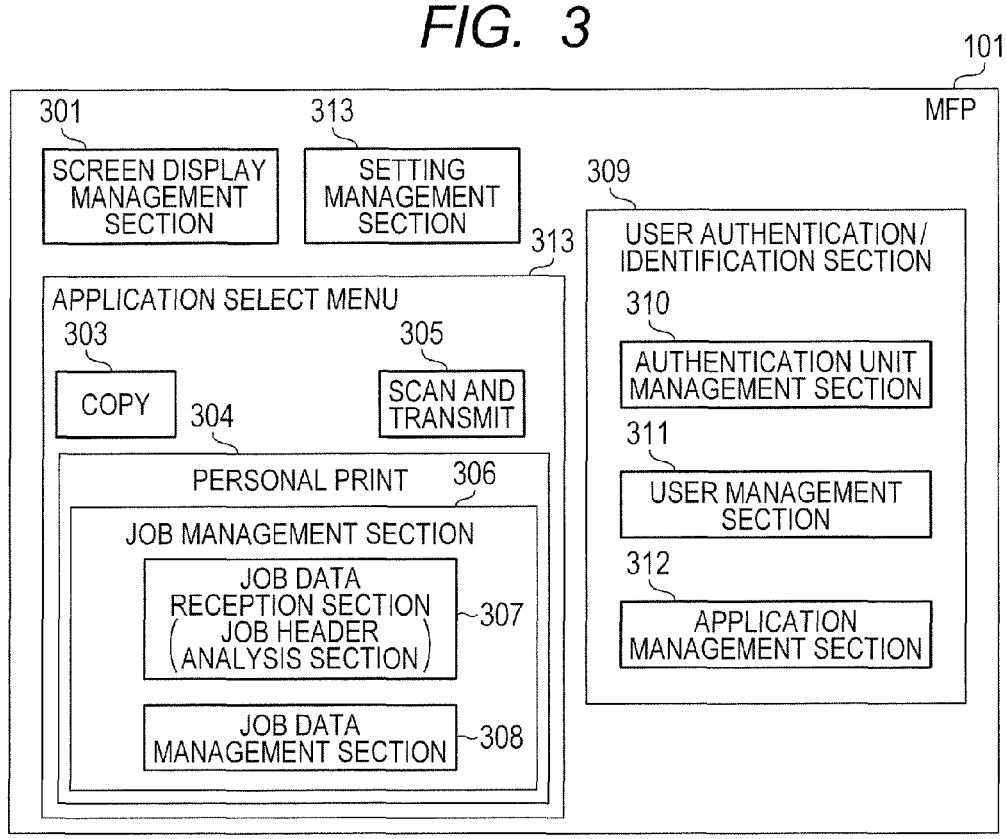
FIG. 3 is a diagram illustrating an example of the software configuration of the MFP.

FIG. 3 is a diagram illustrating an example of software configuration of the MFP 101.

A screen display management section 301 controls to instruct what is to be displayed on the operation unit 208.

An application selection menu 302 provides a menu screen, by which a user selects application, on the operation unit 208 or the like.

Figure 4:
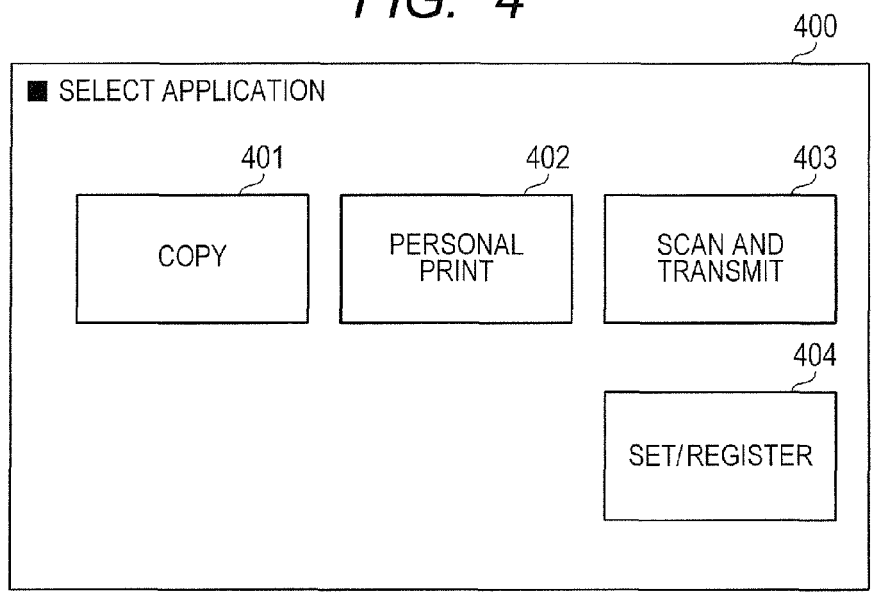
FIG. 4 is a diagram illustrating an example of a menu screen.

FIG. 4 is a diagram illustrating an example of the menu screen. In this screen example, there exists buttons for three applications of "copy" 401, "personal print" 402 and "scan and transmit" 403 and a "set/register" button 404 for providing the setting menu to be managed by a setting management section 313 or the like.

Figure 5:
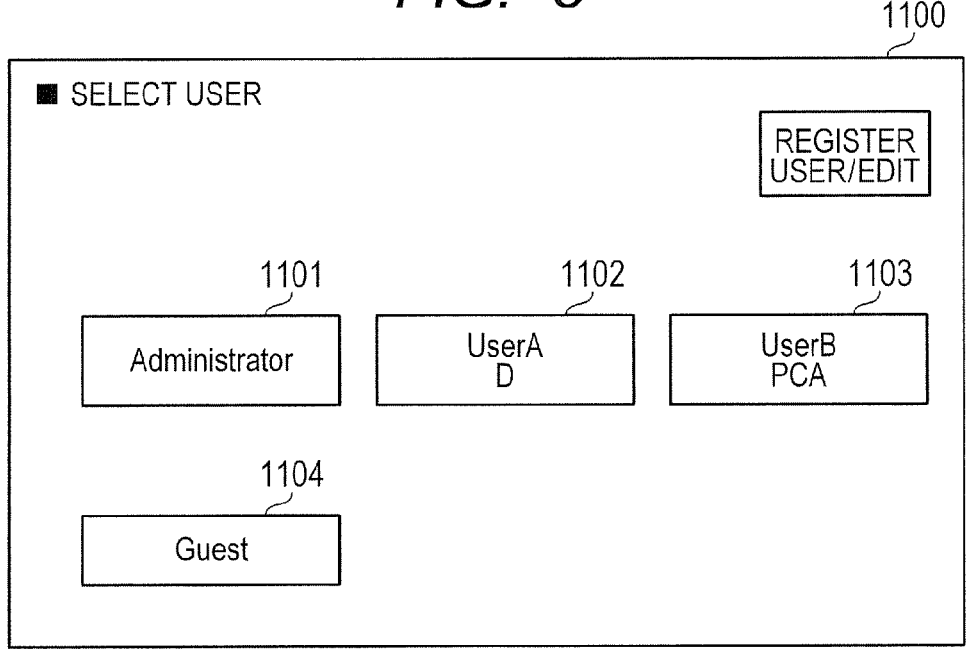
FIG. 5 is a diagram illustrating an example of a user selection screen.

When the "personal print" 402 is depressed in a menu screen 400 of FIG. 4, a user selection screen 1100 as illustrated in FIG. 5 is displayed on the operation unit 208. Icons of users who are user-registered are displayed on the user selection screen 1100.

FIG. 5 is a diagram illustrating an example of the user selection screen.

Figure 6:
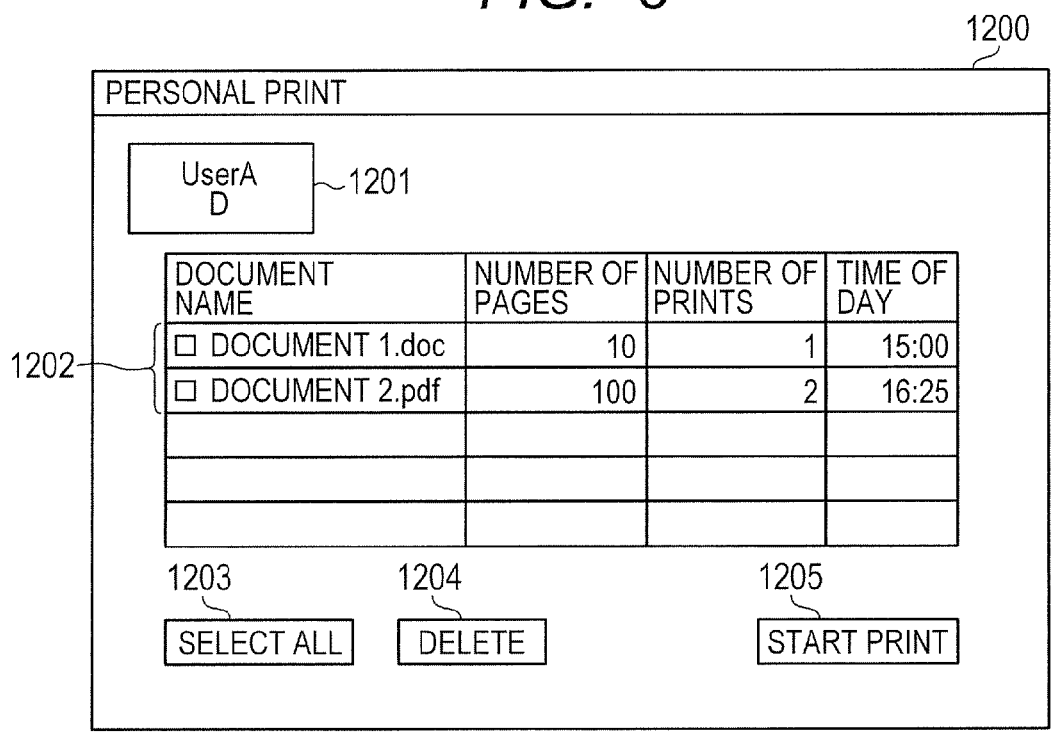
FIG. 6 is a diagram illustrating an example of a print job list screen.

In FIG. 5, a user depresses an own user icon (e.g., a user icon 1102). Then, a list screen of print jobs of the above user as illustrated in FIG. 6 is displayed. Here, the user icon is such an icon, where the user is illustrated by a figure, a picture or the like. The user can utilize a personalization function of the MFP 101 with excellent operability by selecting the own user icon. The user icon is an example of a user object.

FIG. 6 is a diagram illustrating an example of the list screen of the print jobs.

In the list screen of the print jobs in FIG. 6, a job list 1202, which is a list of print jobs stored in a job management section 306 associated with a user name 1201 "User A D", is indicated. When the printing of a print job is performed, the user selects an arbitrary document from the job list 1202 and can instruct to output the print job by depressing a "start print" button 1205. Or, the user can also instruct to delete an arbitrary print job from the job management section 306 by depressing a "delete" button 1204 alter selecting the arbitrary print job. In the selection of the print job, each print job can be selected by depressing each print job item or the whole print jobs can be collectively selected by depressing a "select all" button 1203.

The process of displaying the list screen of print jobs as indicated in FIG. 6 is an example of a display controlling process of displaying the list of print jobs.

Applications of "copy" 303, "personal print" 304 and "scan and transmit" 305 are examples of applications operating on the MFP 101. The application of "copy" 303 is such an application of performing the copy. The application of "personal print" 304 is such an application of performing the printing after a procedure that print jobs submitted from the PC 102 are accumulated, a list of print jobs submitted by a login user is displayed and the user is made to confirm the contents of the print jobs. The "personal print" 304 is configured by the following sections. That is, the job management section 306, a job data analysis section 307 which analyzes header information of the print job and a job data management section 308 which generates a user identification ID by combining necessary information from the header of the print job and associates with the print job configure the "personal print" 304. The user identification ID is an example of user identification information.

The "scan and transmit" 305 is such an application which transmits an image scanned by the scanner 214 to an external by a mail or the like.

A user authentication/identification section 309, which is such a part where a user identification ID registration function is realized, is composed of an authentication unit management section 310, a user management section 311 and an application management section 312.

The authentication unit management section 310 manages whether the MFP 101 operates by what condition among the conditions of "User authentication is not applied", "Authentication is always required when using device (device authentication)" and "Authentication is required when application necessary for authentication is selected (function selection authentication)". The embodiments, which includes the present embodiment, indicated in the following correspond to such a process which is enabled when the MFP 101 is operating with the condition of "User authentication is not applied" (user identification is performed).

The user management section 311 manages an identification ID of the user who uses the MFP 101 and attributes associated with the user such as a display name, an E-mail address, a department name and the like on a UI (user interface). User information generated by a user identification ID generating method of the embodiment, which includes the present embodiment, indicated in the following is managed at the user management section 311.

The application management section 312 manages applications, which require the user authentication/identification, by a list when the "function selection authentication" is set in the authentication unit management section 310.

Figures 7, 8:
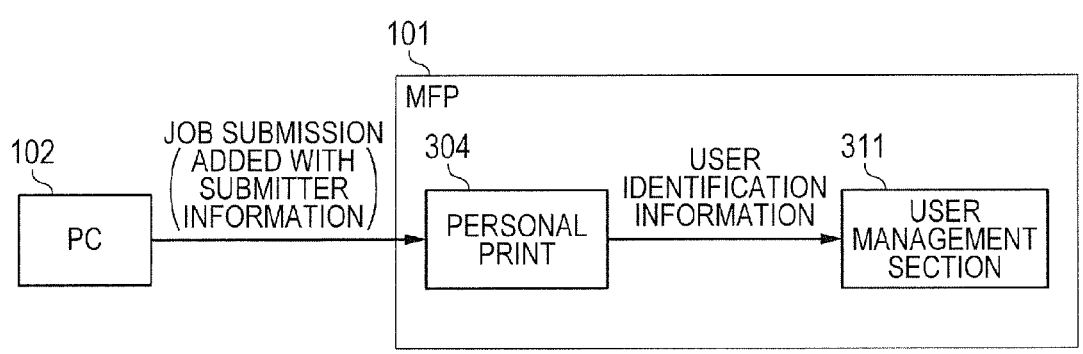
FIG. 7 is a diagram illustrating an example of the list to be managed by an application management section.
FIG. 8 is a diagram illustrating a user automatic registration flow for generating a user identification ID.

FIG. 7 is a diagram indicating an example of a list managed by the application management section 312.

According to the list, it is understood that the authentication/identification of user is required when utilizing the "personal print", the "scan and transmit" and the "set/register", and when utilizing the "copy", the authentication/identification of user is not required. The user authentication is required when an authentication function is enabled, however only the user identification is performed when the authentication function is disabled.

The setting management section 313 unitarily manages the settings related to the MFP 101.

<User Automatic Registration Method>

FIG. 8 is a diagram indicating a flow of a user automatic registration method for generating the user identification ID. The user identification ID is generated from submitter information (job owner information) added to the print job which the application of "personal print" 304 received. The user management section 311 registers the generated user identification ID.

<User Identification ID Generating Method>

Figures 9A, 9B, 9C:
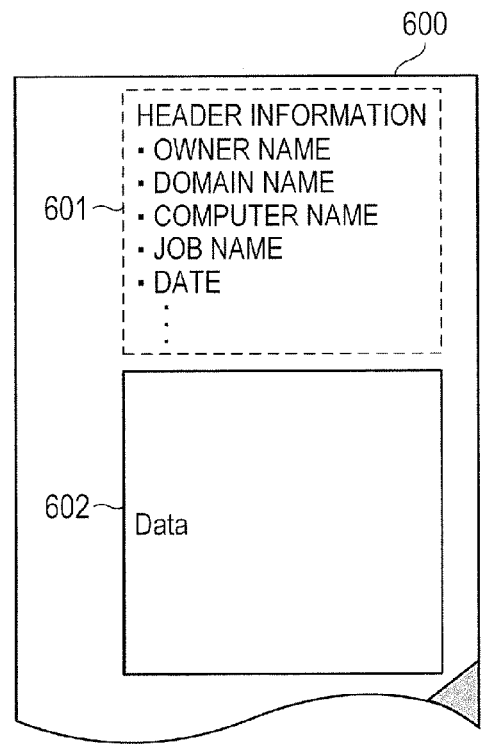
FIGS. 9A, 9B and 9C are diagrams illustrating an example of the data structures in a print job.

FIGS. 9A to 9C are diagrams indicating examples of data configuration in the print job, which the PC 102 submits to the MFP 101, indicated in FIG. 8.

As indicated in FIG. 9A, a personal print job 600 is configured by header information 601 and job data 602 which is actual data. An attribute value of the header information 601 is such information, which a printer driver obtained from an OS of the PC 102, such as "owner name", "domain name", "computer name", "job name", "date" or the like as indicated in FIG. 9B. Information other than the above-described information may be included in the header information 601. In FIG. 9B, an example that a user, who submitted the personal print job to the MFP, sends a print job from a PC, to which the user logged in by the domain authentication, is indicated. From FIG. 9B, it is understood that the owner name is "User A", the domain name is "D", the computer name is "PCA", the submitted job name is "test. txt" and the date is "20140530".

The computer name is an example of an information processing apparatus name.

In contrast to FIG. 9B, FIG. 9C indicates an example of an attribute value of the header information 601 when the print job is transmitted from a PC to which a user logged in locally. In an example of FIG. 9C, it is understood that a value of domain is in a blank state.

The MFP 101 generates a user identification ID by utilizing the "owner name", the "domain name" and the "computer name" included in the header information 601 and combining them with patterns indicated in the following, and the generated user identification ID is stored in the user management section 311 of the MFP 101.

FIG. 10 is a diagram indicating an example of generation patterns of the user identification ID to be generated from the header information 601.

The MFP 101 utilizes the "owner name", the "domain name" and the "computer name" included in the header information 601 and generates a value 701, which was obtained by combining the owner name and the domain name, as a user identification ID when existing all the three pieces of information. The value 701 is a value of the user identification ID in case of FIG. 9B.

The MFP 101 generates a value 702, which was obtained by combining the owner name and the computer name, as a user identification ID when the domain name does not exist in the header information 601. The value 702 is a value of the user identification ID in case of FIG. 9C.

The MFP 101 generates a value 703 of only the owner name as a user identification ID when only the owner name exists in the header information 601.

The MFP 101 generates a value 704, which was obtained by combining the owner name and the domain name, as a user identification ID when only the computer name does not exist in the header information 601.

When the owner name does not exist, since an owner cannot be specified, the MFP 101 generates Guest (value 705) by treating a user as a guest user, as a user identification ID.

As for a case that the computer name does not exist, a case that a print job is submitted to the MFP without utilizing the printer driver, for example, a job transmission or the like by an LPR (line printer) command is considered. When the user identification ID is automatically generated, the MFP 101 inputs "@" between respective information which are combined with each other. A character "@" is prohibited to be input from the operation unit 208, and it becomes possible to distinguish whether the user identification ID is automatically registered or manually registered. Therefore, if the above-described condition is satisfied, the MFP 101 may utilize a character other than the character "@" as information to be input between respective information which are combined with each other.

While, when only the owner name exists (value 703) and when the owner name does not exist (value 705), since the user identification ID is generated from one information, the MFP 101 does not use the character "@". However, in order to distinguish the user identification ID from the manually registered user identification ID, the MFP 101 may add a prohibited character, for example, such as "UserA@" or "Guest@" even when the user identification ID was generated from one information in case of the automatic registration. The generated user identification ID 700 is stored in the HDD 204 or the like by the user management section 311.

As described above, in the present embodiment, the MFP 101 gives priority order to the names, that is, first priority is given to the owner name, second priority is given to the domain name and third priority is given to the computer name from the header information of the received print job, and generates the user identification ID by combining higher-priority two pieces of information. Accordingly, as for a user, who logs in to plural PCs, which utilize the same domain, by performing the user authentication, even if the print jobs are transmitted from any PC among the plural PCs, the print jobs are managed as a print job from the same user in the MFP. Therefore, it is possible for the user to efficiently retrieve the print job on the MFP.

FIG. 11 is a diagram indicating an example of user information stored in the user management section 311.

The generated user identification ID is stored in the user management section 311 as information (user identification ID 801) for identifying user information 800. For example, a user identification ID "UserA@D" of the value 701 is stored like a user identification ID 806 indicated in FIG. 11. In the user information 800, a user name 802 to be displayed on the operation unit 208 as a user icon and a card ID 803, in case of having a card authentication function, are included other than the user identification ID 801. In addition, other information associated with the user identification ID 801 such as a mail address 804 of a user, a department name 805 and the like are included in the user information 800. The user name 802 has the value obtained by making two lines with the portions preceding and following "@" of the user identification ID. However, this method does not restrict the present embodiment, and the user name 802 may be identical with the user identification ID, or have a value obtained by another method of, for example, replacing "@" of the user identification ID with a space.

A user can also manually register and edit information other than the user identification ID of the user information 800 through the menu screen 400 by operating the operation unit 208. The user identification ID 801 is such information, which the user cannot manually register and edit, in order to secure uniqueness of information in the user information 800. In the user information 800, the cooperation of user information when a user authentication function is enabled also can be performed by managing to associate a PW (password) for the user authentication or the card ID 803 for the IC card authentication with the user identification ID.

Figure 12:
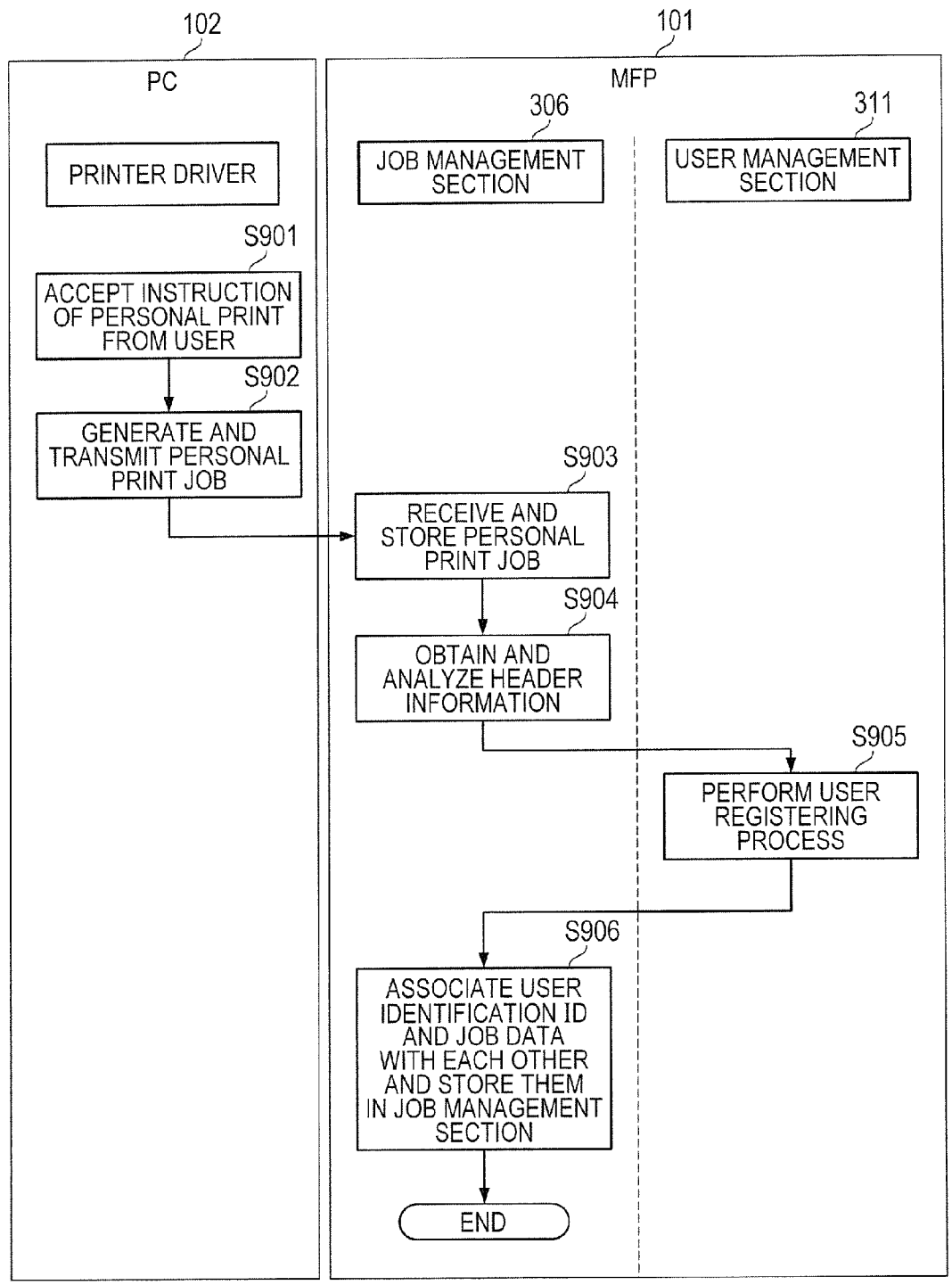
FIG. 12 is a flow chart indicating an example of an information process to be performed by the print system.

FIG. 12 is a flow chart indicating the information processing, where the MFP generates the user identification ID from the header information 601 in the print job obtained from the PC and performs the user registration to the user management section 311 or judges whether or not the user identification ID already exists in the user management section 311 and stores the print job.

In S901, the printer driver of the PC 102 accepts an instruction of the personal print from the user.

In S902, the printer driver generates and transmits the personal print job 600. The personal print job 600 is configured by the header information 601, which includes user information (or information of submitter who submits job), and the job data 602. In S903, the job management section 306 of the personal print 304 of the MFP 101 receives and stores the personal print job.

In S904, the job management section 306 obtains the header information 601 from the personal print job 600 and analyzes the header information 601.

In S905, the user management section 311 performs a user registering process in accordance with an analysis result. The details of the user registering process will be indicated in FIG. 13 to be described later.

In S906, the job management section 306 associates the generated user identification ID and the job data 602 with each other and stores them and then processes indicated in FIG. 12 are terminated.

Figure 13:
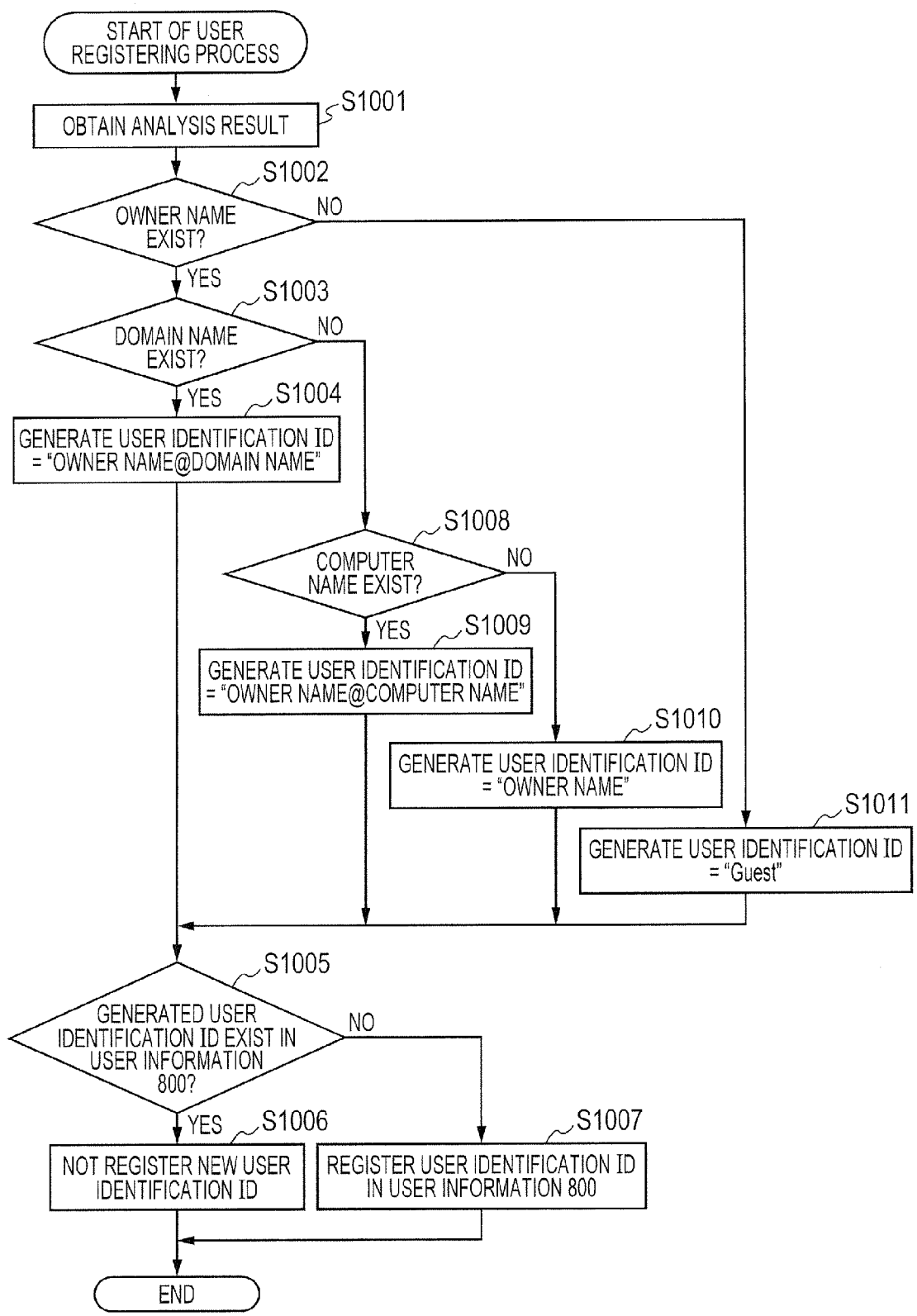
FIG. 13 is a flow chart indicating an example of a user registering process.

FIG. 13 is a flow chart indicating an example of the user registering process.

In S1001, the user management section 311 obtains an analysis result of the header information 601 from the job management section 306.

In S1002, the user management section 311 decides whether or not an owner name exists in the header information 601 on the basis of the analysis result. When the owner name exists in the header information 601, the user management section 311 advances the process to S1003, and when the owner name does not exist in the header information 601, the user management section 311 advances the process to S1011.

In S1003, the user management section 311 decides whether or not a domain name exists in the header information 601 on the basis of the analysis result. When the domain name exists in the header information 601, the user management section 311 advances the process to S1004, and when the domain name does not exist in the header information 601, the user management section 311 advances the process to S1008.

In S1004, the user management section 311 generates a user identification ID which is equal to "owner name@domain name" (value 701 or value 704).

In S1005, the user management section 311 decides whether or not the generated user identification ID already exists in the user identification ID 801 of the user information 800. When the user identification ID already exists in the user identification ID 801 of the user information 800, the user management section 311 advances the process to S1006, and when the user identification ID does not exist, the user management section 311 advances the process to S1007.

In S1006, the user management section 311 does not register the generated user identification ID in the user information 800 and terminates processes indicated in FIG. 13.

On the other hand, in S1007, the user management section 311 registers the generated identification ID in the user information 800 and terminates processes indicated in FIG. 13.

In S1008, the user management section 311 decides whether or not a computer name exists in the header information 601 on the basis of the analysis result. When the computer name exists in the header information 601, the user management section 311 advances the process to S1009, and when the computer name does not exist in the header information 601, the user management section 311 advances the process to S1010.

In S1009, the user management section 311 generates a user identification ID which is equal to "owner name@computer name" (value 702 or the like) and advances the process to S1005.

In S1010, the user management section 311 generates a user identification ID which is equal to "owner name" (value 703 or the like) and advances the process to S1005.

In S1011, the user management section 311 generates a user identification ID which is equal to "Guest" (value 705 or the like) as a print job, which the user cannot specify, and advances the process to S1005. The user identification ID which is equal to "Guest" is an example of user identification information for a guest. However, when the owner name does not exist in the header information 601, since a user cannot be specified, the MFP 101 returns the personal print job 600 to the PC 102 as an error, and that personal print job may not be stored in the MFP 101. A case that the print job is transmitted to the MFP 101 from a mobile terminal is also considered. When information which can specify a mobile terminal is included in the header information 601 of the print job to be transmitted from the mobile terminal, the MFP 101 may generate a user identification ID which includes the above information. As the above information, for example, there is information "oo Phone" (810 in FIG. 11) which indicates a model name or the like of the mobile terminal, information "$\Delta_{os}$" which indicates an OS of the mobile terminal, or the like. Further, when the owner name of the mobile terminal is included in the header information 601, the MFP 101 may generates a user identification ID obtained by combining the owner name with information which can specify the above mobile terminal. The information which can specify the mobile terminal is an example of mobile terminal device information.

The process in S1004, S1009, S1010 or S1011 is an example of a user identification information generating process.

Second Embodiment

In the first embodiment, the user identification ID was generated with patterns indicated in FIG. 10 by processes indicated in FIG. 13.

However, a user oneself can also set a generating method of the user identification ID.

Figure 14:
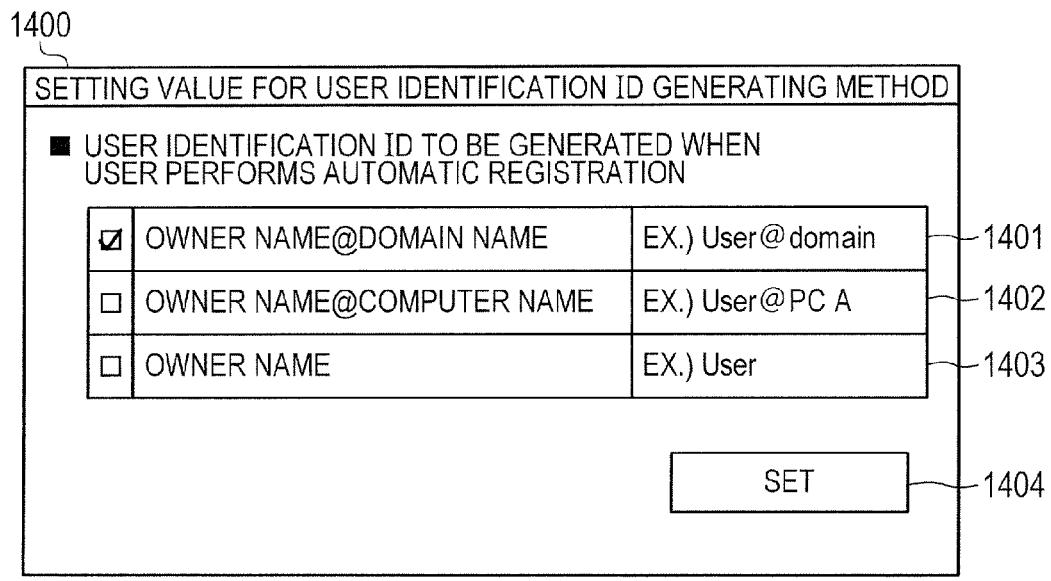
FIG. 14 is a diagram illustrating an example of a setting screen.

FIG. 14 is a diagram indicating an example of a screen for setting generation patterns of the user identification ID to be generated from the header information of the print job indicated in FIG. 10.

The user depresses the "set/register" button 404 illustrated in FIG. 4 to display a setting screen 1400 illustrated in FIG. 14 and performs the setting.

The user selects any from among a combination of user name@domain name (1401), a combination of user name@computer name (1402) and an only user name (1403) and then depresses a setting button 1404.

A setting value selected here is stored in the setting management section 313.

A generation pattern of the user identification ID also may be such a pattern of utilizing other information in the header information 601.

When performing the user registering process of FIG. 13, the user management section 311 generates the user identification ID 700 after confirming the value in the setting management section 313. That is, when the setting value, which was set in the setting management section 313 through the setting screen 1400, is managed, the user management section 311 generates the user identification ID by using submitter information (or attribute information), which was set (or designated) through the setting screen 1400, on the basis of the setting value.

Accordingly, the user can generates a user identification ID having the highest usability corresponding to environment of the user oneself and can automatically register that user identification ID.

According to each of the above embodiments, the image processing apparatus can be utilized without losing usability of the user regardless of the state which is under the environment that the user authentication to the PC utilizing the domain is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-146767, filed Jul. 17, 2014, which is hereby incorporated by reference herein in its entirety.

What is claimed is:

1. An information processing apparatus which can communicate with an external device via a network and cause a displaying device to display information, the information processing apparatus comprising:
    a controlling portion comprising at least one memory configured to store a program and at least one processor configured to execute the program, the controlling portion being configured to perform:
    a process of obtaining print data having attribute information from the external device;
    a process of obtaining user name information and domain name information from the attribute information of the obtained print data;
    a process of generating, based on the user name information and the domain name information, a name including the user name and the domain name as identification information for uniquely identifying a user; and
    a process of causing the displaying device to display the generated name including the user name and the domain name as the identification information for uniquely identifying the user for performing a printing process by the user.

2. The information processing apparatus according to claim 1, wherein the controlling portion is configured to record the identification information according as the print data is obtained from the external device.

3. The information processing apparatus according to claim 1, wherein the controlling portion is configured to record the identification information in a case where the print data having the attribute information in which a combination of the user name information and the domain name information is new is obtained, and is configured to not record the identification information in a case where the print data having the attribute information in which the combination of the user name information and the domain name information is not new.

4. The information processing apparatus according to claim 1, wherein, in a case where the print data including the user name information and external device name information and not having the domain name information is obtained as the attribute information, the controlling portion is configured to cause the generating process to generate the name including the user name and an external device name as the identification information on the basis of the user name information and the external device name information, and to cause the display device to display the generated name including the user name and the external device name.

5. The information processing apparatus according to claim 1, wherein the controlling portion is configured to cause the displaying device to display a plurality of pieces of identification information in a list form.

6. The information processing apparatus according to claim 1, wherein the attribute information has been stored in a part of a header of the print data.

7. The information processing apparatus according to claim 1, further comprising an image forming portion configured to form an image based on the print data.

8. The information processing apparatus according to claim 1,
    wherein the controlling portion is configured to cause the displaying device to display a first screen on which an object which can be selected by the user and is associated with the user name information and the domain name information is arranged, based on the print data having the user name information and the domain name information being obtained as the attribute information,
    wherein the controlling portion is configured to cause the displaying device to display a second screen on which a list of print data having the attribute information associated with the object is arranged, based on selection of the object, and
    wherein the generated name including the user name and the domain name is described on the object.

9. The information processing apparatus according to claim 1, wherein the controlling portion is configured to perform:
    a process of obtaining first print data having the user name information and the domain name information and not having an external device name information, and causing the displaying device to display an object on which the user name and the domain name are described and an external device name is not described;
    a process of obtaining second print data having the user name information and the external device name information and not having the domain name information, and causing the displaying device to display an object on which the user name and the external device name are described and the domain name is not described; and
    a process of obtaining third print data having the user name information, the domain name information and the external device name information, and causing the displaying device to display an object on which the user name and the domain name are described and the external device name is not described.

10. An information processing apparatus which can communicate with an external device via a network, comprising:
    a controlling portion comprising at least one memory configured to store a program and at least one processor configured to execute the program, wherein the controlling portion is configured to perform:
    a process of obtaining print data having attribute information from the external device;
    a first identifying process of identifying print data having user name information and domain name information and not having external device name information, based on a combination of a user name and a domain name included in the attribute information;
    a second identifying process of identifying print data having the user name information and the external device name information and not having the domain name information, based on a combination of the user name and the external device name included in the attribute information;

a third identifying process of identifying print data having the user name information, the domain name information and the external device name information, based on the combination of the user name and the domain name included in the attribute information;

a process of generating, as identification information of a user, a name including a combination of the user name, the domain name and/or the external device name, in accordance with one of the first, second and third identifying processes; and a process of causing a displaying device to display the generated name as the identification information of the user for performing a printing process by the user.

11. The information processing apparatus according to claim 10,
wherein the information processing apparatus is configured to cause a recording portion to record information, and
wherein the controlling portion is further configured to perform:
a process of causing the recording portion to record, as identification information, the generated name including both the user name and the domain name and not including the external device name, according to the first identifying process;
a process of causing the recording portion to record, as the identification information, the name including the user name and the external device name and not including the domain name, according to the second identifying process; and
a process of causing the recording portion to record, as the identification information, the name including both the user name and the domain name and not including the external device name, according to the third identifying process.

12. The information processing apparatus according to claim 10,
wherein identification information of a name including both the user name and the domain name and not including the external device name is first identification information generated by the generating process in accordance with the first and third identifying processes, and identification information of a name including both the user name and the external device name and not including the domain name is second identification information generated by the generating process in accordance with the second identifying process, and
wherein the controlling portion is further configured to perform:
causing the displaying portion to display a first object on which the first identification information is described;
a process of causing the displaying portion to display a second object on which the second identification information is described.

13. The information processing apparatus according to claim 12,
wherein a screen which is used to selectably display the first object and the second object is a first screen, and the displaying portion selectably displays a plurality of screens including the first screen, and wherein the controlling portion is further configured to perform:
a process of causing the displaying portion to display a second screen having a list of the print data associated with the first identification information, based on selection of the first object; and
a process of causing the displaying portion to display a third screen having a list of the print data associated with the second identification information, based on selection of the second object.

14. An information processing method for an information processing apparatus which can communicate with an external device via a network and cause a displaying device to display information, the information processing method comprising:
obtaining print data having attribute information from the external device;
obtaining user name information and domain name information from the attribute information of the obtained print data;
generating, based on the user name information and the domain name information, a name including the user name and the domain name as identification information for uniquely identifying a user; and
causing the displaying device to display the generated name including the user name and the domain name as the identification information for uniquely identifying the user for performing a printing process by the user.

15. A non-transitory computer-readable storage medium which stores therein a program to cause a computer to perform an information processing method for an information processing apparatus which can communicate with an external device via a network and cause a displaying device to display information, the information processing program comprising:
code for obtaining print data having attribute information from the external device;
code for obtaining user name information and domain name information from the attribute information of the obtained print data;
code for generating, based on the user name and the domain name information, a name including the user name and the domain name as identification information for uniquely identifying a user; and
code for causing the displaying device to display the generated name including the user name and the domain name as the identification information for uniquely identifying the user for performing a printing process by the user.

16. An information processing method for an information processing apparatus which can communicate with an external device via a network, the information processing method comprising:
obtaining print data having attribute information from the external device;
a first identifying process of identifying print data having user name information and domain name information and not having external device name information, based on a combination of a user name and a domain name included in the attribute information;
a second identifying process of identifying print data having the user name information and the external device name information and not having the domain name information, based on a combination of the user name and an external device name included in the attribute information;

a third identifying process of identifying print data having the user name information, the domain name information and the external device name information, based on the combination of the user name and the domain name included in the attribute information;

generating, as identification information of a user, a name including a combination of the user name, the domain name and/or the external device name, in accordance with one of the first, second and third identifying processes; and causing a displaying device to display the generated name as the identification information of the user for performing a printing process by the user.

17. A non-transitory computer-readable storage medium which stores therein a program to cause a computer to perform an information processing method for an information processing apparatus which can communicate with an external device via a network, the program comprising:

code for obtaining print data having attribute information from the external device;

code for a first identifying step of identifying print data having user name information and domain name information and not having external device name information, based on a combination of a user name and a domain name included in the attribute information;

code for a second identifying step of identifying print data having the user name information and the external device name information and not having the domain name information, based on a combination of the user name and an external device name included in the attribute information;

code for a third identifying step of identifying print data having the user name information, the domain name information and the external device name information, based on the combination of the user name and the domain name included in the attribute information;

code for generating, as identification information of a user, a name including a combination of the user name, the domain name and/or the external device name, in accordance with one of the first, second and third identifying processes; and code for causing a displaying device to display the generated name as the identification information of the user for performing a printing process by the user.

* * * * *